United States Patent
Billings

(10) Patent No.: US 7,009,553 B1
(45) Date of Patent: *Mar. 7, 2006

(54) DEVICE AND METHOD FOR ALERT AND DENSITY ALTITUDE FEATURES IN A TRANSPONDER

(75) Inventor: Robert W. Billings, Shawnee, KS (US)

(73) Assignee: Garmin Ltd., (KY)

( * ) Notice: Subject to any disclaimer, the term of this patent is extended or adjusted under 35 U.S.C. 154(b) by 59 days.

This patent is subject to a terminal disclaimer.

(21) Appl. No.: 11/052,330

(22) Filed: Feb. 7, 2005

Related U.S. Application Data

(63) Continuation of application No. 10/378,466, filed on Mar. 3, 2003, now Pat. No. 6,864,830.

(51) Int. Cl.
  *G01S 13/08* (2006.01)
(52) U.S. Cl. .............. 342/120; 342/121; 342/46; 342/51; 342/65
(58) Field of Classification Search .......... 342/26 R, 342/26 B, 42, 46, 47, 51, 61, 63, 65, 120–123
See application file for complete search history.

(56) References Cited

U.S. PATENT DOCUMENTS

| | | | |
|---|---|---|---|
| 3,590,636 A * | 7/1971 | Eddy, Jr. ................ | 73/178 H |
| 4,106,343 A | 8/1978 | Cook ..................... | 73/387 |
| 4,253,335 A | 3/1981 | Shimomura ............. | 73/384 |
| 4,283,705 A | 8/1981 | James et al. ............ | 340/973 |
| 5,532,698 A | 7/1996 | Nielsen et al. .......... | 342/120 |
| 6,259,380 B1 | 7/2001 | Jensen .................... | 340/970 |
| 6,449,573 B1 * | 9/2002 | Amos ...................... | 702/98 |
| 6,584,384 B1 * | 6/2003 | Gremmert et al. ....... | 701/4 |
| 6,864,830 B1 * | 3/2005 | Billings .................. | 342/65 |
| 2001/0047230 A1 * | 11/2001 | Gremmert et al. ....... | 701/4 |
| 2003/0193408 A1 | 10/2003 | Brown et al. ............ | 340/945 |

OTHER PUBLICATIONS

"Nonlinear techniques for Mode C climb/descent rate estimation in ATC systems." Sviestins.E; Wigren T. IEEE. Transactions.on.Control.Systems.Technology (USA), vol. 9, No. 1, p. 163.74, Jan. 2001.*

* cited by examiner

Primary Examiner—John B. Sotomayor
(74) Attorney, Agent, or Firm—Devon A. Rolf

(57) ABSTRACT

A transponder having a subsystem for providing an altitude alert function signifying a deviation from a set altitude is described. The subsystem includes an input for receiving an altitude deviation limit associated with the set altitude, a CPU receiving updated altitude and determining a difference between the updated altitude and the set altitude associated with the altitude deviation limit, and a transponder subsystem output device for providing the difference between the updated altitude and the set altitude to a user.

18 Claims, 4 Drawing Sheets

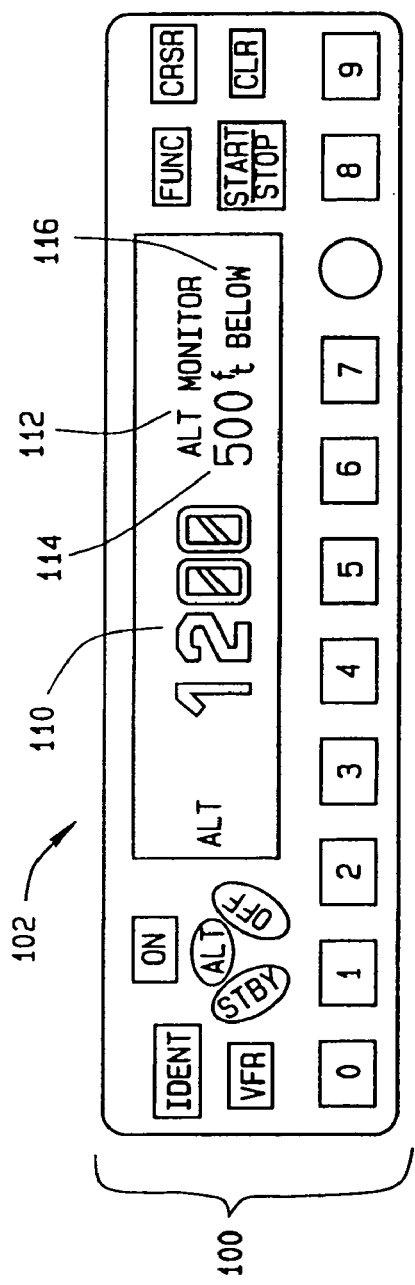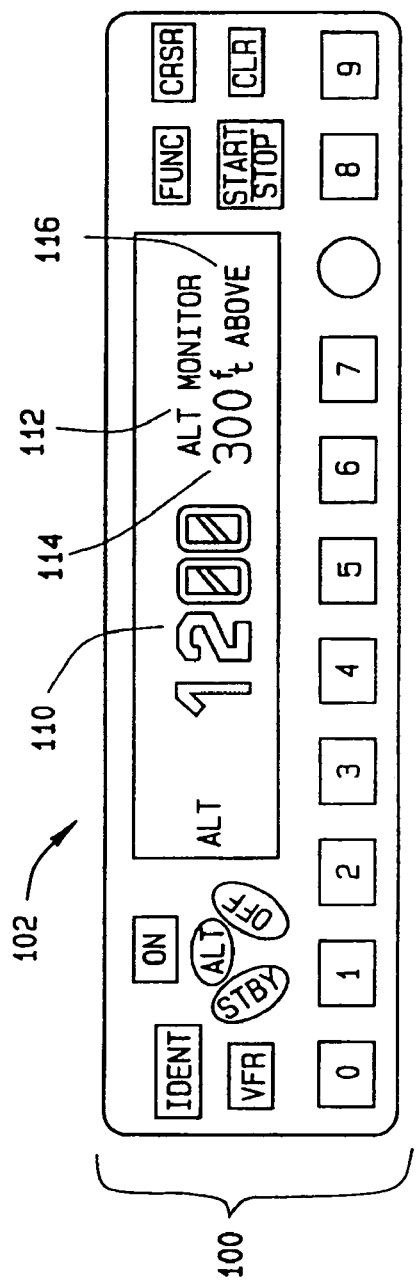
FIG. 3
FIG. 4

DEVICE AND METHOD FOR ALERT AND DENSITY ALTITUDE FEATURES IN A TRANSPONDER

The present application is a continuation application of U.S. patent application Ser. No. 10/378,466, filed Mar. 3, 2003, now U.S. Pat. No. 6,864,830 B1.

BACKGROUND OF THE INVENTION

The present invention generally relates to avionics electronics. More specifically, the present invention relates to methods and devices for providing altitude alert and density altitude features within transponders.

A variety of transponders exist today for use with the Air Traffic Control Radar Beacon System (ATCRBS) and that support various communications protocols, such as Mode-C, Mode-A and Mode-S communication's protocols. ATCRBS ground stations, each have a rotating radar dish that transmits a beam having directional characteristics to transmit and receive information to and from aircraft within the relevant air space. The radar dish transmits over a common frequency to all of the aircraft. Each ATCRBS ground station also includes an omnidirectional antenna co-located with the directional radar dish. The omnidirectional antenna transmits, over a control frequency, among other things, side lobe suppression (SLS) signals which, as explained below in more detail, are synchronized to, and used in combination with, transmissions over the common frequency from the directional radar dish. The SLS signals are utilized to prevent aircraft outside of the beam from replying to transmissions generated by the directional radar dish. The aircraft transponders compare certain pulses transmitted from the radar dish over the common frequency with certain pulses transmitted from the omnidirectional antenna over the control frequency. The aircraft transponder determines whether to reply to received signals depending upon the relation between the compared pulses.

However, existing transponders have met with certain limitations. For example, existing transponders do not provide a pilot with altitude data nor density altitude data. Density altitude is an altitude that is an estimate of an aircraft's expected performance based on atmospheric conditions. For example, atmospheric conditions may cause an aircraft flying at 7000 feet to experience flight conditions as if it were flying at 8500 feet under standard atmospheric conditions.

A need remains for an improved transponder able to provide additional data to a pilot or crew to help to avoid aircraft accidents associated with altitude and density altitude. It is an object of certain embodiments of the present invention to meet one or more of these needs and to meet other needs that will become apparent from the present application.

BRIEF DESCRIPTION OF THE INVENTION

In accordance with one aspect of the present invention, a transponder is provided including a subsystem for providing an altitude alert function signifying a deviation from a set altitude. The subsystem comprises an input for receiving an altitude deviation limit associated with the set altitude. A CPU receives altitude updates and determines a difference between the updated altitude and the altitude associated with the altitude deviation limit. A transponder subsystem output provides the difference between the updated altitude and the set altitude to a user.

In accordance with another aspect of the present invention, a method provides an altitude alert function in a transponder where the altitude alert function signifies a deviation from a set altitude. The method comprises receiving a current pressure altitude at the transponder, configuring the transponder with an altitude deviation limit, and receiving a pressure altitude update at the transponder. The method further comprises determining a difference between the updated pressure altitude and the altitude associated with the altitude deviation limit and providing a transponder subsystem output representing the difference as a deviation in altitude to a user.

In accordance with still another aspect of the present invention, a method provides a density altitude function in a transponder. The transponder has a user interface configured to display a density altitude page. The method comprises receiving data relating to at least one of density altitude, static air temperature and pressure altitude, total air temperature, indicated airspeed, and pressure altitude. An outside air temperature is calculated based on the received data. Density altitude is calculated based on the received data, and the outside air temperature and the density altitude are displayed on the user interface.

In accordance with yet another aspect of the present invention, a transponder is provided which comprises at least one interface which receives altitude data, at least one input for inputting an altitude deviation limit, a signal processing unit coupled to the interface and the input, and a CPU coupled to the signal processing unit. The transponder is configured to receive at least one of altitude data, static air temperature data, total air temperature data, ground speed data, and vertical speed data at the interface, and a combination of the CPU and signal processing unit determines an altitude deviation value based on altitudes received at one of the interfaces. The transponder provides an alert if the altitude value is outside of the altitude deviation limit.

BRIEF DESCRIPTION OF THE DRAWINGS

FIG. 3 illustrates a user interface with an altitude alert display.

FIG. 4 illustrates the user interface of FIG. 3 with another altitude alert display.

DETAILED DESCRIPTION OF THE INVENTION

Figure 1:
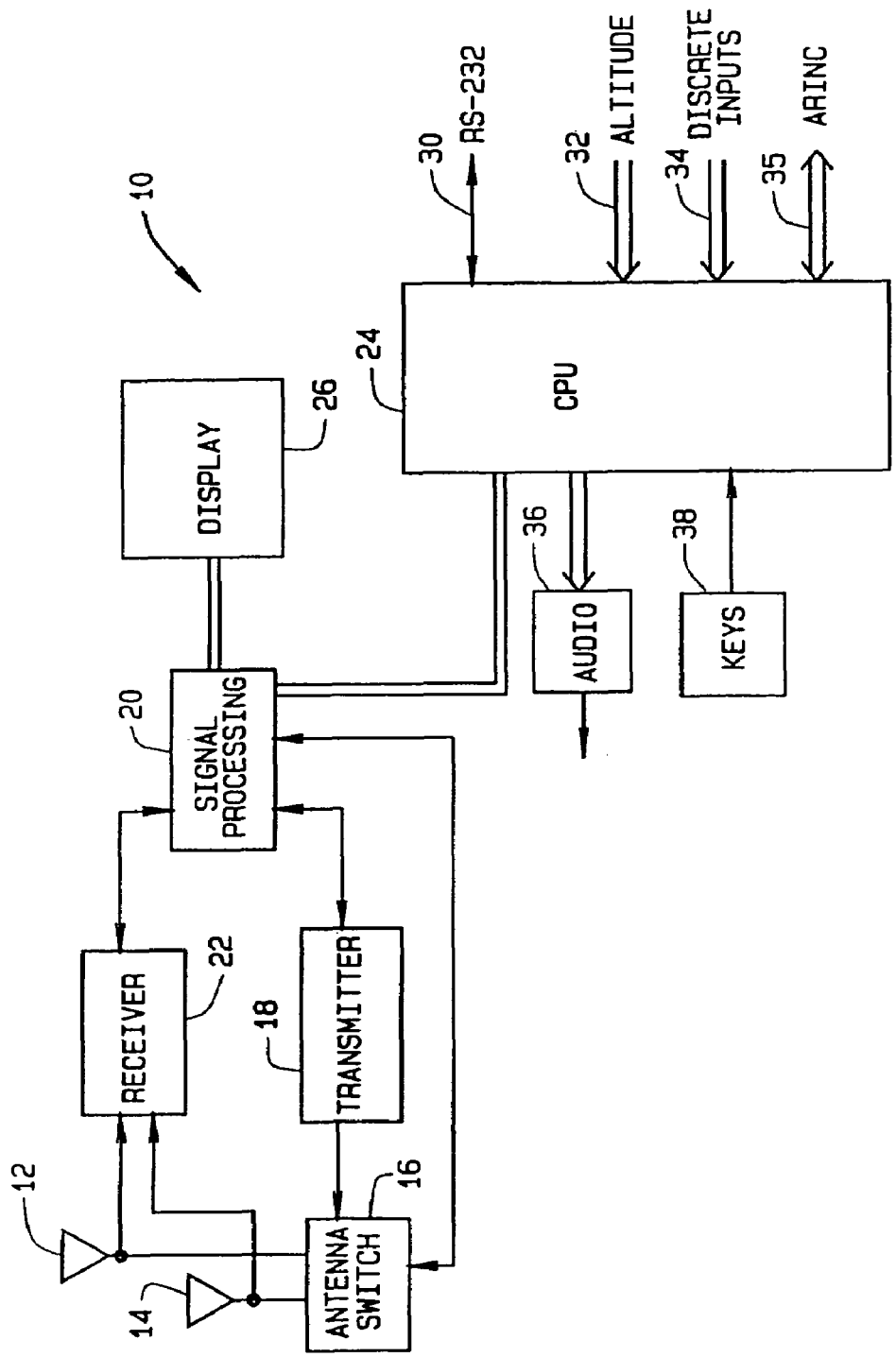
FIG. 1 illustrates a block diagram of a transponder formed in accordance with an embodiment of the present invention.

FIG. 1 illustrates a block diagram of a transponder 10 formed in accordance with an embodiment of the present invention. The transponder 10 represents a diversity transponder in that it may be connected to first and second antenna 12 and 14 located on the top and bottom sides of an aircraft. One of the top and bottom antenna 12 and 14 is selected for use based upon one or more of several criteria such as received signal strength and which signal was received first. An antenna switch 16 selects one of the top and bottom antenna 12 and 14 based upon these criteria. A transmitter 18 outputs signals to be transmitted from the selected one of the top and bottom antenna 12 and 14. The signals to transmitter 18 originate from a signal processing unit 20. A receiver 22 communicates received signals to signal processing unit 20. Signal processing unit 20 provides processed signals to a CPU 24 and a display unit 26. CPU 24 also provides signals to signal processing unit 20. Top and bottom antenna 12 and 14 are connected to identical parallel receive frequencies. Received signals from top and bottom antenna 12 and 14 are supplied to a receiver 22 which has signal conditioning circuits (not shown) which process the received signals in an analog or digital format that are output to signal processing unit 20. It is understood that referring to either signal processing unit 20 and CPU 24 also includes a reference to memory, either internal or external to unit 20 and CPU 24 which is utilized in performing the functions described herein.

Transponder 10 includes at least one subsystem configured to transmit and receive data from other systems. For example, in one embodiment, CPU 24 of transponder 10 is configured with an RS-232 interface 30, configured to receive an altitude input 32, for example, through an altitude encoder parallel interface. Transponder 10 is further configured with a number of discrete inputs 34. Additionally, transponder 10 receives altitude inputs from an ARINC 429 interface 35, for example, from an altimeter, and a remote input altitude. Static air temperature, total air temperature, ground speed, and vertical speeds are also received by transponder 10, at either CPU 24 or signal processing unit 20, through one or more of the above listed interfaces. Transponder 10 also includes an audio circuit 36 and a user interface 38 which, in one embodiment, is a keypad or keyboard. The audio circuit 36, user interface 38 and altitude input 32 cooperate to provide an altitude alert function as explained below in more detail.

Alternative embodiments of transponder 10 exist, for example, where discrete inputs 34 and altitude input 32 interface with signal processing unit 20 rather than CPU 24. In another embodiment, display 26 interfaces to CPU 24 rather than signal processing unit 20. In still another embodiment, audio circuit 36 and user interface 38 interface to signal processing unit 20 rather than CPU 24.

Figure 2:
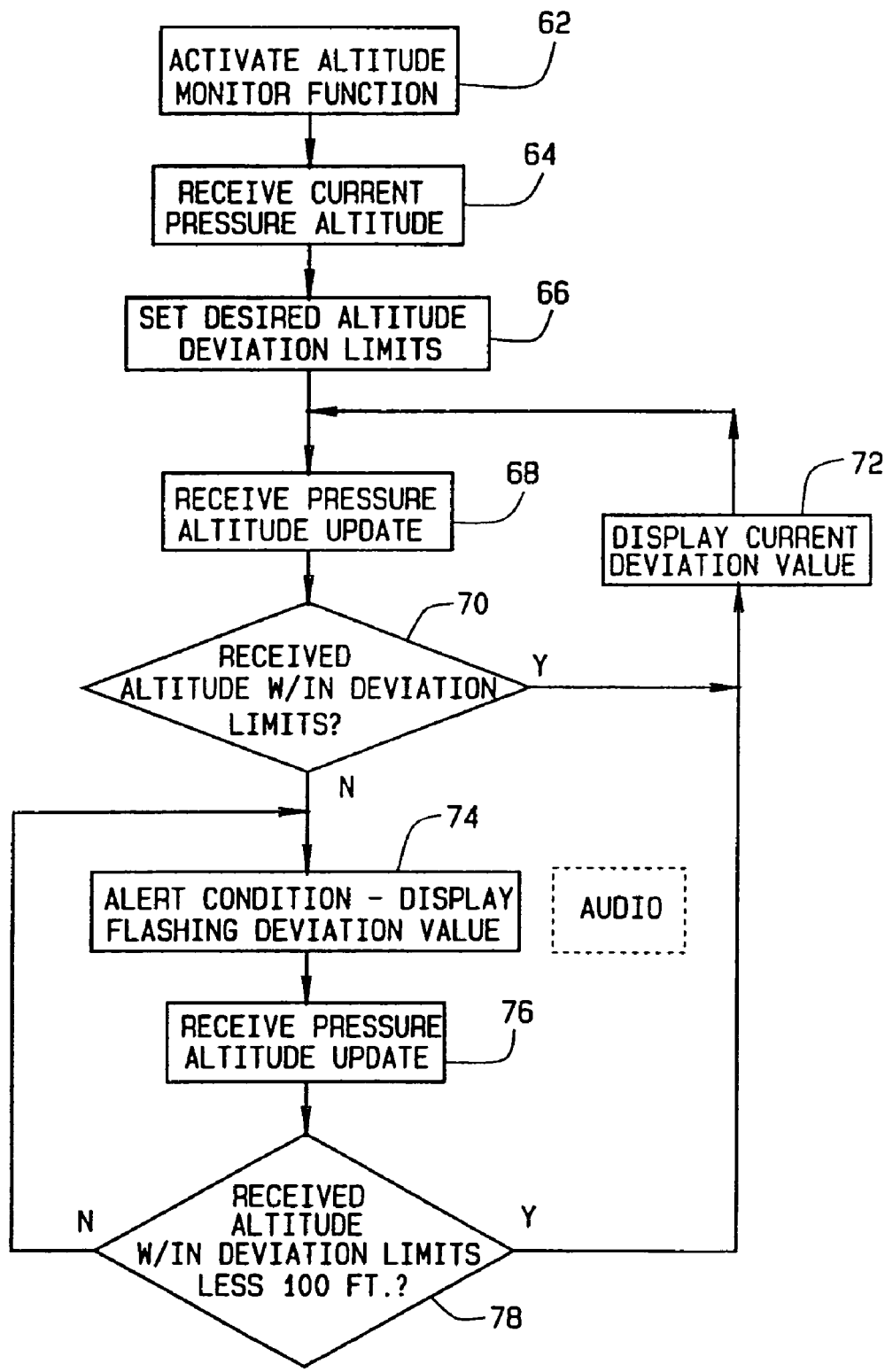
FIG. 2 illustrates a flow chart of the steps carried out by a transponder formed in accordance with an embodiment of the present invention.

FIG. 2 illustrates a block diagram 60 of a sequence performed by transponder 10 when providing an altitude alert function. First, the altitude alert function is activated at step 62. In one embodiment, transponder 10, or at least user interface 38, includes a START/STOP button (not shown) which activates (or de-activates) the altitude alert function. Once activated a measurement of current pressure altitude is received at step 64. Pressure altitude is calculated based upon the atmospheric pressure measured at a pressure transducer mounted on an aircraft, and is a measurement periodically provided to transponder 10 through at least one of the interfaces to transponder 10 described above with respect to FIG. 1. A user is afforded the ability to configure the altitude alert subsystem of transponder 10 by setting the desired altitude deviation limits at step 66. For example, an aircraft flying at 2000 feet is likely more concerned with altitude fluctuations than an aircraft flying at 15,000 feet. The pilot of the aircraft at 2000 feet may want to be alerted of a change in altitude of 100 feet (<1900 feet or >2100 feet), due to terrain conditions. Hence, the pilot would enter an altitude deviation limit of 100 feet at step 66. When flying at 15,000 feet, the pilot is probably not as concerned with terrain conditions, and may desire to enter an altitude deviation limit of 1000 feet (<14,000 feet or >16,000 feet).

Once the desired altitude deviation limits are set at step 66, a periodic update to pressure altitude (a periodic measurement of actual altitude) is received at step 68. At step 70 the transponder 10 determines whether the updated pressure altitude is within the altitude deviation limits set at step 66. An altitude deviation value (updated pressure altitude±altitude received at step 64) is displayed at step 72, and transponder 10 returns to step 68 to obtain another update to the pressure altitude. Optionally, the display 26 may indicate whether the altitude deviation value is above or below the pressure altitude received at step 64.

In one example, an altitude received at step 64 is 5000 feet. The pilot enters an altitude deviation limit of 400 feet. An updated pressure altitude of 5300 feet is received. In one embodiment, transponder 10 will display an altitude deviation value of 300 feet above (the altitude received at step 64).

Returning to step 70, if the updated pressure altitude is not within the altitude deviation limits, flow passes to step 64 where an alert condition is displayed. The alert condition may be presented to the user by flashing the altitude deviation value on the display 26. Optionally, an external alert annunciator, for example, a flashing bulb or other visual indicator, may be included which provides a flashing indication of the alert condition. In still another option, the alert condition is announced utilizing audio circuit 36 (shown in FIG. 1) which is configured to provide a tone and an audio message alerting a user to the altitude deviation value.

Transponder 10 continuously receives pressure altitude updates at step 76. Once the updated pressure altitude returns to a value which is within the altitude deviation limits the alert condition is ceased. Utilizing the above example, the pilot has allowed the aircraft to drop to an altitude of 4300 feet (transponder displaying a flashing altitude deviation value of 700 feet below). Once the pilot has elevated the aircraft to an altitude equal to or greater than 4600 feet, the flashing display of altitude deviation value becomes a static display of altitude deviation value.

Optionally, the transponder 10 may be set to require that the updated pressure altitude return by a pre-configured amount within the altitude deviation limits (step 78). For example, the updated pressure altitude may need to be 100 feet within the altitude deviation limits. Once the updated pressure altitude returns to an acceptable level (step 78) (e.g. within 100 feet), the flashing display of the alert condition will cease and be replaced by a static display of an updated altitude deviation value (step 72). When an external alert annunciator and/or audio circuit 36 are used, they are stopped at step 78 as well. The alarm notification ceases once the updated pressure altitude is within the altitude deviation limits by the pre-configured amount. Utilizing the above example, the pilot will have to attain an altitude of 4700 feet before the flashing display of the altitude deviation value will become a static display.

The transponder 10 may display in several manners the current altitude deviation value from the selected altitude deviation limits. For example, the current altitude deviation value may be displayed as numeric characters, from one to four characters in length, depending on the altitude deviation value and selected altitude units (i.e. feet, meters). In addition, a direction indicator (e.g., "ABOVE" or "BELOW") may indicate the aircraft's position relative to the selected altitude deviation limits (e.g., "BELOW" indicates the aircraft is below the altitude received at step 64). When the altitude alert function is activated in transponder 10 and the altitude deviation value exceeds the altitude deviation limits, the numeric characters, the direction indicator ("ABOVE" or "BELOW") and an optional external altitude alert annunciator provide a flashing indication, to warn a pilot.

Optionally, once an updated pressure altitude exceeds the altitude deviation limits, if the amount of deviation from the altitude deviation limits is less than the pre-configured amount, but within a margin value (for example 100 feet, of the altitude deviation value), the direction indicator and the external altitude annunciator shall continue to flash. In other words, once the direction indicator and annunciator have begun flashing, in order to reset the altitude alert function, the altitude deviation value must be less than the altitude deviation limits less the margin value. Reiterating the above example, the desired altitude (altitude received at step 64) is 5000 feet, the configured altitude alert deviation value is 400 feet, the margin value is 100 feet, and the updated pressure altitude has become 4300 feet. The direction indicator and the external altitude annunciator are flashing, and will continue to flash until the updated pressure altitude becomes equal to or greater than 4700 feet (but less than 5400 feet). When transponder 10 is configured with an audio alert function and a current deviation in altitude (updated pressure altitude) from the altitude received at step 64 exceeds the altitude deviation limits, a tone is provided to the pilot and a verbal message follows. For example, the message may be "leaving set altitude".

Alternatively, the transponder 10 is configured with a number of display pages, one or more of which concern the altitude alert function. FIG. 3 illustrates one embodiment of a user interface 100, or subsystem output, for transponder 10. Included on user interface 100 is a display page 102 which is utilized to display the above described altitude alert function. When the updated pressure altitude (received at step 68) exceeds one of the altitude deviation limits (set at step 66), and the altitude alert function is configured for page change, the altitude alert display page 102 is automatically displayed. As shown in FIG. 3, the display page 102 includes a current pressure altitude 110 and a mode/page indicator 112 denoting that an altitude alert function is activated. The display page 102 also includes an altitude deviation indicator 114 denoting the amount by which the current pressure altitude 110 (updated pressure altitude) falls below or exceeds the altitude deviation limit (set in step 66). A direction indicator 116 informs the operator of whether the current altitude 110 (updated pressure altitude) is above or below the desired altitude (altitude received at step 64).

Referring specifically to display page 102, an altitude alert condition is shown in FIG. 3 which indicates that the current pressure altitude 110 being received by transponder 10 1200 feet which is 500 ft below the desired altitude (received at step 64).

FIG. 4 illustrates a display page 102 which indicates that the current altitude 110 (updated pressure altitude) currently being received and displayed by transponder 10 is 1200 feet which is 300 ft above the desired altitude (received at step 64).

In another embodiment, the altitude alert function includes minimum and maximum alert operation values, which when combined with the user entered altitude deviation limit, provides a window in which the altitude alert function remains active. When the aircraft rises above or falls below these alert operation values combined with the altitude deviation limit, the altitude alert function is deactivated.

Specifically, when the altitude alert function is active and the difference between the updated pressure altitude and the altitude received at step 64 is equal to, or exceeds, the maximum alert operation value plus the altitude deviation limit, (or is equal or less than the minimum alert operation value minus the altitude deviation limit) the altitude alert function is de-activated (turned OFF). For example, if the altitude received at step 64 is 5000 feet, the maximum deviation value is 1000 feet, and the altitude deviation limit is 400 feet, when the updated pressure altitude becomes equal to or more than 6400 feet or equal to or less than 3600 feet, the altitude alert function de-activates. When the altitude alert function is de-activated, transponder 10, on the altitude alert page, displays an "OFF" indication.

It should be noted that the altitude alert function can be reset during the course of a flight. For example, while the altitude alert function, as described, is based upon an altitude received at step 64 (shown in FIG. 2), the description is based upon step 64 only for ease of description. Utilizing user interface 100, a pilot is able to reset the altitude alert function at various times, and altitude levels, during a flight. As an example, one portion of a flight might be at 5000 ft and a subsequent portion might be at 10,000 ft. As the aircraft climbs from 5000 ft to 10,000 ft the altitude alert function will likely be de-activated, (e.g. the maximum deviation value will likely be exceeded), as described above. The pilot will then reinitiate the altitude alert function once an altitude of 10,000 ft has been attained, and enter a new set of altitude deviation limits.

Figure 5:
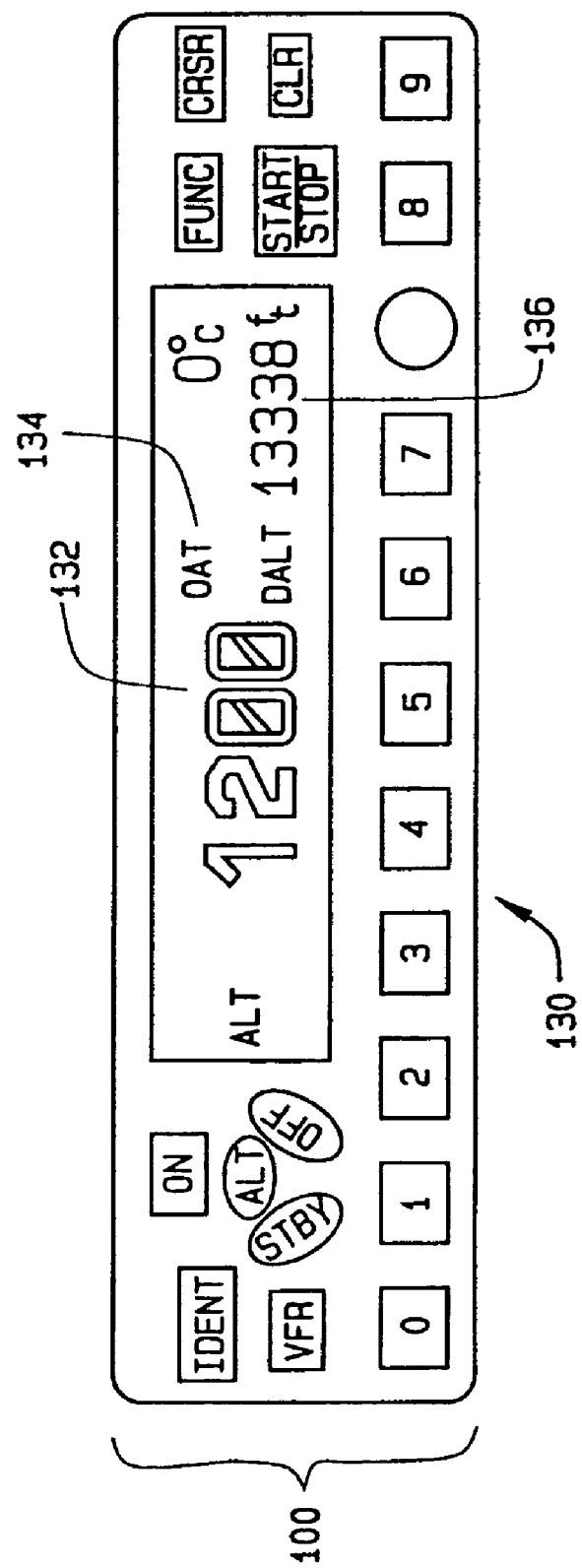
FIG. 5 illustrates the user interface of FIG. 3 with a density altitude display.

FIG. 5 illustrates another embodiment of user interface 100 for transponder 10 which includes a display page 130 that provides an outside air temperature and a density altitude. Specifically, in the embodiment shown, and referring to display page 130, transponder 10 displays a current altitude 132 (updated pressure altitude), an outside air temperature (OAT) 134 (e.g. 0 degrees Celsius), and a current density altitude (DALT) 136 (13,386 feet). In a specific embodiment outside air temperature is displayed as three numeric characters, in selectable units (Celsius or Fahrenheit), and current density altitude is displayed as five numeric characters, in selectable altitude units. In one embodiment, display page 130 is only able to be displayed if transponder 10 is configured to receive temperature data from an external source, for example, at least one of RS-232 interface 30, discrete inputs 34, ARINC 429 interface 35, and a temperature sensor input (not shown in FIG. 1). In one embodiment, the density altitude value display utilizes the following external sources: density altitude, static air temperature and pressure altitude, and total air temperature, indicated airspeed, and pressure altitude.

Density altitude is pressure altitude corrected for non-standard temperature, and it is utilized to determine airplane performance. Performance charts for some aircraft are based on density altitude. When density altitude is high (temperatures above standard), aircraft performance is reduced. Conversely, aircraft performance improves in low density altitude (dense air) conditions. Pressure altitude and density altitude are equal when the temperature is standard for that pressure altitude. In one embodiment, in order to determine density altitude, transponder 10 is programmed to determine a density according to:

$$\text{density} = (\text{pressure} \times \text{molecular weight (of air)}) / (\text{ideal gas law constant} \times \text{temperature in Rankin}).$$

For example, for dry air at sea level at 59 degrees F and a pressure of 29.92 inches of mercury, density is $(29.92 \times 29)/(21.85 \times (59+459)) = 0.0767$. In one embodiment, densities are pre-calculated and stored in a memory of transponder 10. Density is related to altitude, pressure, and temperature. In at least some known applications, density is referred to as a standard air column. Density altitude, at least in one embodiment, is calculated utilizing tables of stored densities according to:

$$\text{Density altitude} = [11,346 - (148,300) \times (\text{density})] / (0.37921 - \text{density}).$$

In one example, for a density of 0.5707, density altitude is 8948 feet. While the actual altitude may be an altitude of 7000 feet, atmospheric conditions (temperature, humidity, pressure) indicate that the aircraft will perform as if it is at an altitude of 8948 feet, and such a density altitude is displayed on display 110, providing a pilot with the operating conditions his or her aircraft is being presented, and allowing the pilot to react accordingly. Providing density altitude therefore allows a pilot to fly their aircraft based on the conditions the aircraft is experiencing, rather than solely based on an altitude reading.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for providing a density altitude function in a transponder, the transponder receiving updated altitude and transmitting the updated attitude, the transponder having a user interface configured to display a density altitude page, said method comprising:
   receiving data relating to at least one of static air temperature and pressure altitude, total air temperature, indicated airspeed, and pressure altitude;
   calculating an outside air temperature based on the received data;
   calculating the density altitude based on the received data; and
   displaying the outside air temperature and the density altitude on the user interface.

2. The method of claim 1, wherein the density altitude represents an altitude estimating an aircraft's expected performance based on atmospheric conditions.

3. The method of claim 1, wherein the density altitude differs from an actual altitude of an aircraft.

4. The method of claim 1, wherein the density altitude represents pressure altitude corrected for nonstandard temperature.

5. The method of claim 1, further comprising pre-calculating density values and storing in memory the density values, the density altitude being calculated based on the stored density values.

6. The method of claim 1, further comprising receiving data relating to all of the static air temperature and pressure altitude, total air temperature, indicated airspeed, and pressure altitude.

7. The method of claim 1, further comprising calculating the outside air temperature based on all of static air temperature, total air temperature, Indicated airspeed, and pressure altitude.

8. The method of claim 1, further comprising calculating the density altitude based on all of static air temperature, total air temperature, indicated airspeed, and pressure altitude.

9. A transponder configured to transmit an altitude and provide an altitude alert function, said transponder comprising:
   an input receiving updated altitude;
   an output transmitting the updated altitude;
   inputs receiving data relating to at least one of static air temperature and pressure altitude, total air temperature, indicated airspeed, and pressure altitude;
   a processor unit calculating an outside air temperature based on the received data and calculating the density altitude based on the received data; and
   a user interface displaying the outside air temperature and the density altitude.

10. The transponder of claim 9, wherein the density altitude represents an altitude estimating an aircraft's expected performance based on atmospheric conditions.

11. The transponder of claim 9, wherein the density altitude differs from an actual altitude of an aircraft.

12. The transponder of claim 9, wherein the density altitude represents pressure altitude corrected for nonstandard temperature.

13. The transponder of claim 9, further comprising memory storing pre-calculates density values, the processor calculating the density altitude based on the stored density values.

14. The transponder of claim 9, wherein said inputs receive data relating to all of the static air temperature and pressure altitude, total air temperature, indicated airspeed, and pressure altitude.

15. The transponder of claim 9, wherein said processor unit calculates the outside air temperature based on all of static air temperature, total air temperature, indicated airspeed, and pressure altitude.

16. The transponder of claim 9, wherein said processor unit calculates the density altitude based on all of static air temperature, total air temperature, indicated airspeed, and pressure altitude.

17. The transponder of claim 9, wherein said processor unit includes signal processing unit coupled to said interface and said inputs; and a CPU coupled to said signal processing unit.

18. The transponder of claim 9, wherein said inputs comprise at least one input to said processor unit and a keyboard interfaced to said processor unit.

* * * * *